(12) United States Patent
Hoelzle

(10) Patent No.: US 6,741,657 B1
(45) Date of Patent: May 25, 2004

(54) CIRCUIT ARRANGEMENT FOR TRANSMITTING PULSES VIA A TRANSMISSION PATH

(75) Inventor: Josef Hoelzle, Bad Woerishofen (DE)

(73) Assignee: Infineon Technologies AG, Münich (DE)

( * ) Notice: Subject to any disclaimer, the term of this patent is extended or adjusted under 35 U.S.C. 154(b) by 653 days.

(21) Appl. No.: 09/593,403

(22) Filed: Jun. 14, 2000

(30) Foreign Application Priority Data

Jun. 16, 1999 (DE) .......................... 199 27 587

(51) Int. Cl.⁷ .............................. H04L 27/00
(52) U.S. Cl. ........................ 375/256; 375/295
(58) Field of Search ................ 375/256, 259, 375/295, 288, 264

(56) References Cited

U.S. PATENT DOCUMENTS 4,516,236 A * 5/1985 Hadziomerovi ............. 370/276

FOREIGN PATENT DOCUMENTS

DE OS 40 20 719 1/1992

OTHER PUBLICATIONS

Patents Abstracts of Japan, E–705, Jan. 19, 1989, vol. 13/No. 23, for Japanese Application No. 62–61716.

* cited by examiner

Primary Examiner—Temesghen Ghebretinsae
(74) Attorney, Agent, or Firm—Schiff Hardin LLP

(57) ABSTRACT

In a circuit arrangement for transmitting impulses via a transmission path which allows short pulses to be transmitted via a longer transmission path, for example within integrated circuits, a frequency divider is provided having an input at which the pulses to be transmitted are present and an output connected to the transmission path. Further, a frequency multiplier is provided, whose input is connected to the transmission path and having an output at which the transmitted impulses are present.

4 Claims, 3 Drawing Sheets

CIRCUIT ARRANGEMENT FOR TRANSMITTING PULSES VIA A TRANSMISSION PATH

BACKGROUND OF THE INVENTION

1. Field of the Invention

The present invention relates to a circuit arrangement for transmitting pulses via a transmission path.

2. Description of the Prior Art

In the digital technology, it is frequently a problem to transmit short pulses within integrated circuits or via interconnects of motherboards over longer paths. The longer the line—namely the transmission path—the more its lowpass effect takes effect, so that short pulses can only be tapped at the end of the transmission path in a strongly damped manner. This property becomes more disturbing as the pulses become shorter.

In order to be able to transmit the pulse cleanly, it is possible to dimension the driver correspondingly high. The capacity of the transmission path can be reloaded sufficiently fast by means of a correspondingly high driver. An insufficiently high driver reduces the amplitude of the transmitted pulse and therefore the signal-to-noise ratio, allowing jitter to easily occur. However, a high current demand is, disadvantageously, the result of a correspondingly high driver.

It is also possible to lengthen the pulse to be transmitted using a multi-stage delay circuit (as shown in FIG. 1). For this purpose, the short pulses S1 to be transmitted are directly supplied to the first input of an OR gate OR1 and also are supplied to the second input of the OR element OR1 via a delay element V. Pulses S3, which are lengthened by the delay time Δt, are then received at the output of the OR gate OR1. The lengthened pulses are then supplied to a second delay stage, whose structure corresponds to the first delay stage, so that pulse S4 that is lengthened by the delay time 2*Δt is available to the transmission path US at the output of the second OR element OR2. FIG. 2 shows the appertaining signal curves. If the input pulses S1 are extremely short, the signal processing must ensue in a number of steps, since the OR gate generates undesired double-pulses given time delays Δ that are larger than the pulse width. Disadvantageously, the dissipated power and the required chip surface increases with each additional delay stage.

German OS 40 20 719 discloses a method for transmitting a digital data signal with a frequency divider and a frequency multiplier having a delay element.

Japanese Application 63227113 discloses a circuit arrangement for transmitting pulses with a frequency divider, which has two flip-flops, and a frequency multiplier, which has an EXOR gate.

SUMMARY OF THE INVENTION

An object of the present invention is to provide a circuit arrangement for transmitting pulses via a long transmission path wherein the above discussed disadvantages are avoided.

This object is inventively achieved in a circuit arrangement for transmitting pulses via a transmission path having a frequency divider having an input to which the pulses to be transmitted are supplied and having an output connected to the transmission path. In addition, a frequency multiplier is provided, whose input is connected to the transmission path and an output at which the transmitted pulses are present.

The frequency divider can be a first toggle-flip-flop.

In the inventive circuit arrangement, an output signal that is identical with respect to the signal to be transmitted regarding period length and pulse width can be generated in a simple manner at the output of the circuit arrangement. For this purpose, the frequency divider additionally includes a second toggle-flip-flop, with the pulses to be transmitted being supplied at the clock input of the first toggle-flip-flop and the output of the first toggle-flip-flop is connected to the transmission path. The pulses to be transmitted are supplied inverted at the clock input of the second toggle-flip-flop. For this purpose, an amplifier with complementary outputs precedes the toggle-flip-flops. The output of the second toggle-flop-flop is also connected to the transmission path. The frequency multiplier has an EXOR gate, with a first input and a second input connected to the transmission path. The transmitted signal can be tapped at the output of the EXOR gate.

Using an amplifier that has the complementary outputs and that precedes the toggle-flip-flops has the advantage that the toggle-flip-flops can be of the same edge control type. Therefore, the two toggle-flip-flops can be triggered on the low/high-edge (positively edge-triggered) or on the high/low-edge (negatively edge-triggered) in the respectively same way. As a result, the switching times of both toggle-flip-flops are identical and the pulse widths at the input and output therefore match given short pulses.

Each toggle-flip-flop can be realized as a simple edge-triggered D-flip-flop.

The inventive circuit arrangement can be formed as an integrated circuit.

DESCRIPTION OF THE PREFERRED EMBODIMENTS

Figure 1:
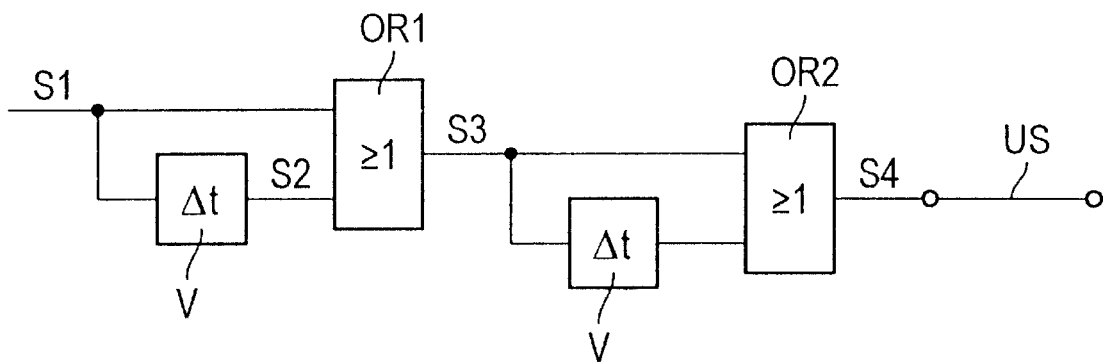
FIG. 1 shows a circuit for pulse transmission according to the prior art, as explained above.
Figure 2:
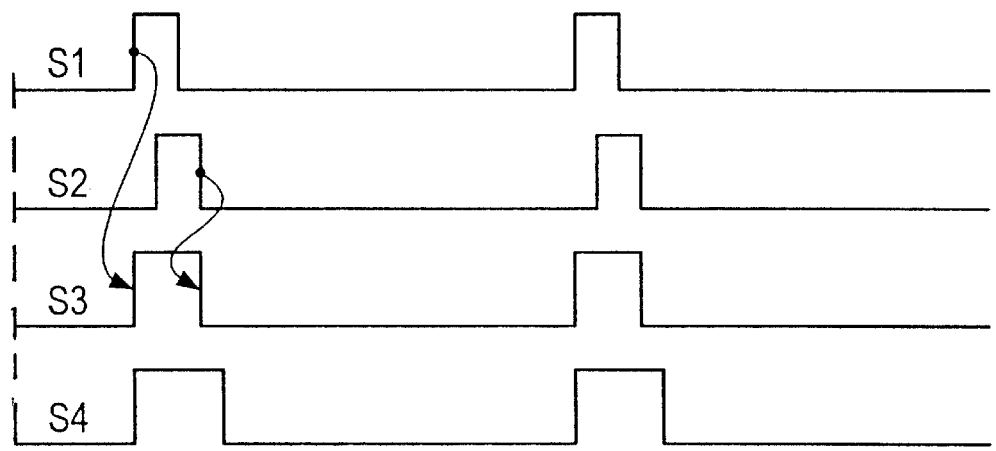
FIG. 2 shows the signal curves which arise in the circuit of FIG. 1, as explained above.
Figure 3:
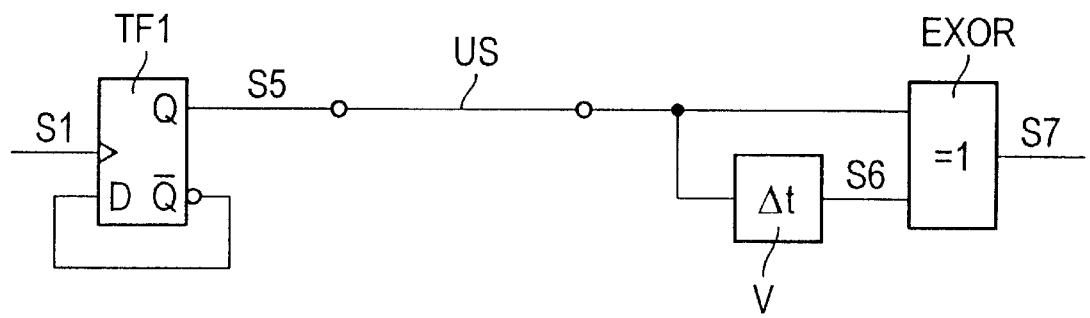
FIG. 3 shows a first inventive embodiment of a circuit arrangement for the transmission of pulses.

The circuit arrangement for pulse transmission shown in FIG. 3 has a first toggle-flip-flop TF1, with a clock input at which the pulses S1 to be transmitted are present. The toggle flip-flop TF1 in FIG. 3 is realized as an edge-triggered D-flip-flop, whose inverting output $\overline{Q}$ is connected to the D-input of the D-flip-flop.

Figure 4:
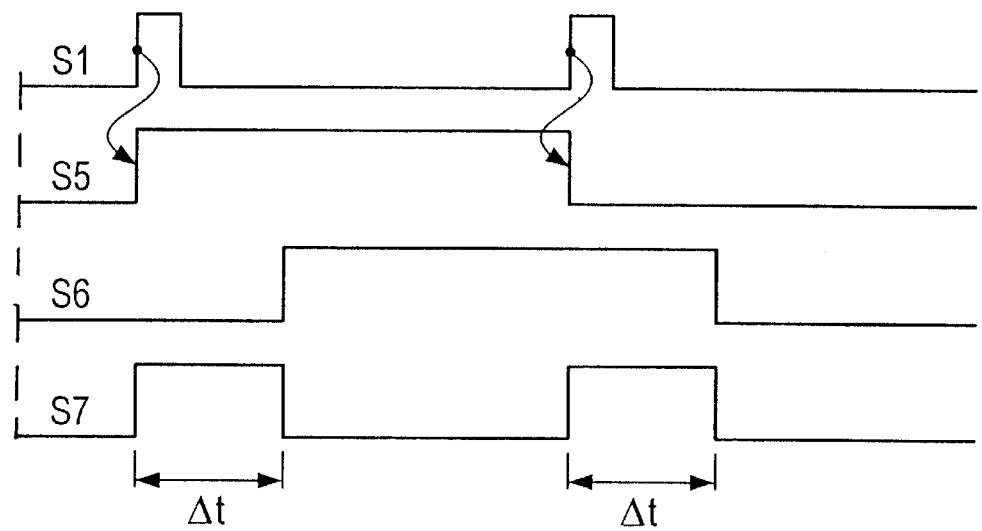
FIG. 4 shows the signal curves which arise in the circuit of FIG. 3.

A signal S5 is present at the output Q of the toggle-flip-flop TF1, whose level changes with each positive edge of the input signal S1. FIG. 4 shows the signal curve of the signal S5 at the output Q. The output Q of the toggle-flip-flop TF1 is connected to the first input of an exclusive OR-gate EXOR and, via a delay element V, to the second input of the exclusive OR-gate EXOR. The transmitted signal S7 (shown in FIG. 4) is adjacent at the output of the EXOR-gate. The pulse width of the signal S7 corresponds to the delay time Δt of the delay element V. A signal having a frequency that is half of the frequency of the signal S to be transmitted, is transmitted via the transmission path US by means of the inventive circuit. In addition, the pulse duration of the signal S5 that is transmitted on the transmission path US is advantageously extended such that it corresponds to the period length of the signal S1 at the input of the circuit arrangement. Therefore, the lowpass effect of the transmission path US no longer influences the quality of the signal transmission in a negative way. The pulse width of the signal S7 at the output of the EXOR gate can be adjusted by means of the delay element V. It is therefore possible to adapt, in a simple way, the pulse width of the signal S7 at the output of the EXOR-gate to the requirements of the following circuits (not shown).

Figure 5:
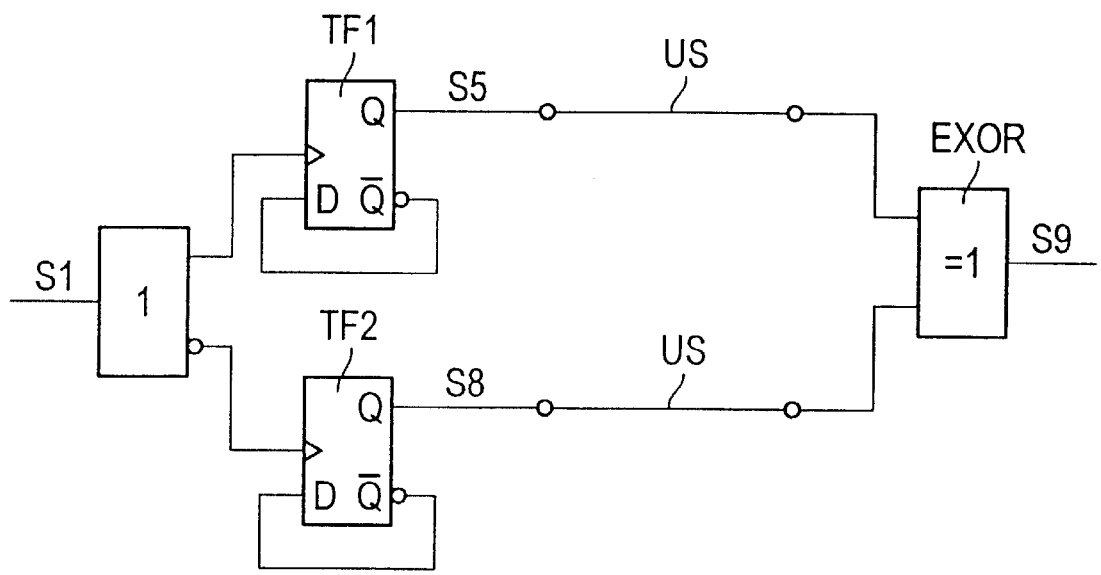
FIG. 5 shows a second inventive embodiment of a circuit arrangement for the transmission of pulses.
Figure 6:
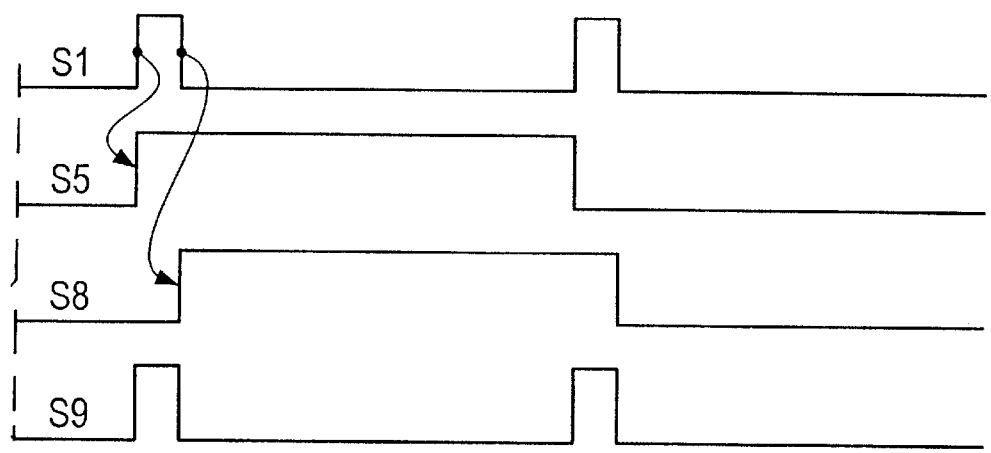
FIG. 6 shows the signal curves which arise in the circuit of FIG. 5.

In the circuit arrangement shown in FIG. 5, the signal S1 to be transmitted is supplied in the first toggle-flip-flop TF1 in a non-inverted form and is supplied to a second toggle-flip-flop TF2 in inverted form. This ensues by means of a driver with an inverter, which is connected upstream. The outputs of the two toggle-flip-flops TF1 and TF2 are respectively connected to the transmission path US. In the present case, the transmission path US has two lines. The transmission path US is connected to the two inputs of the EXOR gate. At its output, the signal S9 can be tapped, which is equal to the input signal S1 in pulse width and period length. At the toggle-flip-flop TF1 the output changes the level with the rising edge of the input signal S1, whereas the output changes the level with the falling edge of the input signal S1 at the toggle-flip-flop TF2. As a result of the exclusive OR-disjunction of the two output signals S5 and S8 of the toggle-flip-flops TF1 and TF2, an exact image of the input signal S1 is possible.

It is also possible not to connect the Q-outputs of the toggle-flip-flops TF1 and TF2 to the lines of the transmission path, but to utilize the $\overline{Q}$-outputs therefor. In this case as well, the $\overline{Q}$-outputs of the toggle-flip-flops TF1 and TF2 are connected to the D-inputs of the toggle-flip-flops TF1 and TF2.

An advantages of the embodiments of the inventive circuit arrangement shown in the FIGS. 3 and 5 is that high-performance drivers are not necessary. With an input signal frequency of approximately 8 gigahertz, the current demand can be up to 20 times less than the current demand required by the prior art described in the introductory part of the specification.

It is also advantageous that the delay levels need not be in immediate succession. Therefore, the circuit is substantially independent of pulse duration fluctuations, due to manufacturing tolerances, voltage fluctuations and/or temperature fluctuations. In the prior art as described in the introductory part of the specification, the switching times can fluctuate up to 30%. Arbitrarily short pulses can be transmitted across longer paths by means of the inventive circuit arrangement. Also, the inventive circuit arrangement is free of jitter.

The current saving obtained with the inventive circuit arrangement becomes greater as the keying ratio of the signal S1 to be transmitted becomes smaller, i.e., the smaller the ratio of pulse duration to pause duration.

Although modifications and changes may be suggested by those skilled in the art, it is the intention of the inventor to embody within the patent warranted hereon all changes and modifications as reasonably and properly come within the scope of his contribution to the art.

I claim as my invention:

1. A circuit arrangement for transmitting pulses via a transmission path, comprising:

an edge-triggered toggle-flip-flop having an input at which said pulses to be transmitted are present and an output connected to said transmission path;

an exclusive-OR gate having a first input connected to said transmission path and a second input connected via an adjustable delay element to said transmission path; and a width of pulses output by said exclusive-OR gate is set by said adjustable delay element to adapt the width of the output pulses to following circuits.

2. A circuit arrangement for transmitting pulses via a transmission path, comprising:

an edge-triggered toggle-flip-flop having an input at which said pulses to be transmitted are present and an output connected to said transmission path;

an exclusive-OR gate having a first input connected to said transmission path and a second input connected via an adjustable delay element to said transmission path; and an inverting output of said toggle-flip-flop is connected to a D input thereof.

3. A circuit arrangement for transmitting pulses via a transmission path, comprising:

an edge-triggered toggle-flip-flop having an input at which said pulses to be transmitted are present and an output connected to said transmission path;

an exclusive-OR gate having a first input connected to said transmission path and a second input connected via an adjustable delay element to said transmission path; and pulses output onto said transmission path are one-half frequency and have a wider pulse width than said pulses to be transmitted.

4. A method for transmitting pulses via a transmission path, comprising the steps of:

providing an edge-triggered toggle-flip-flop having an input at which said pulses to be transmitted are present and an output connected to said transmission path;

with the edge-triggered toggle-flip-flop, transmitting onto said transmission path pulses having one-half of a frequency of said pulses to be transmitted and having a wider pulse width than a pulse width of said pulses to be transmitted so that a low-pass effect of said transmission path on the pulses on the transmission path is substantially reduced;

providing at an opposite end of said transmission path an exclusive-OR gate connected to said transmission path at a first input and a second input connected also to said transmission path by a delay element; and outputting from said exclusive-OR gate pulses having a pulse width determined by an adjustment of said delay element to adapt the output pulses to a following circuit.

* * * * *